United States Patent

[11] 3,552,651

| [72] | Inventor | Harry F. Garrison |
| | | 7470 Gerald Ave., Warren, Mich. 48092 |
| [21] | Appl. No. | 732,123 |
| [22] | Filed | May 27, 1968 |
| [45] | Patented | Jan. 5, 1971 |

[54] COMBINED FAUCET AND DRINKING FOUNTAIN
1 Claim, 5 Drawing Figs.

[52] U.S. Cl. ............................................. 239/25,
137/597, 137/612.1, 137/625.41; 251/85;
137/616.7
[51] Int. Cl. ................................................. E03c 1/02
[50] Field of Search ............................................. 239/24, 25,
27, 428.5; 137/609, 610, 612, 612.1, 625.47;
251/83, 85

[56] References Cited
UNITED STATES PATENTS

| 2,274,511 | 2/1942 | Worthington | 239/25X |
| 2,524,956 | 10/1950 | Brunetti | 239/25 |
| 2,606,064 | 8/1952 | Taylor | 239/25 |
| 2,643,104 | 6/1953 | Holden | 239/428.5 |
| 3,086,746 | 4/1963 | Holleron | 251/83 |
| 3,108,748 | 10/1963 | Fiore | 239/25 |

*Primary Examiner*—Robert G. Nilson
*Attorney*—Barthel and Bugbee

ABSTRACT: This faucet near the nozzle outlet has a drinking fountain spout which is opened and closed by a swinging valve member on a pivot shaft which also carries a baffle plate. The pivot shaft is rotated by a handle.

PATENTED JAN 5 1971
3,552,651
FIG. 1
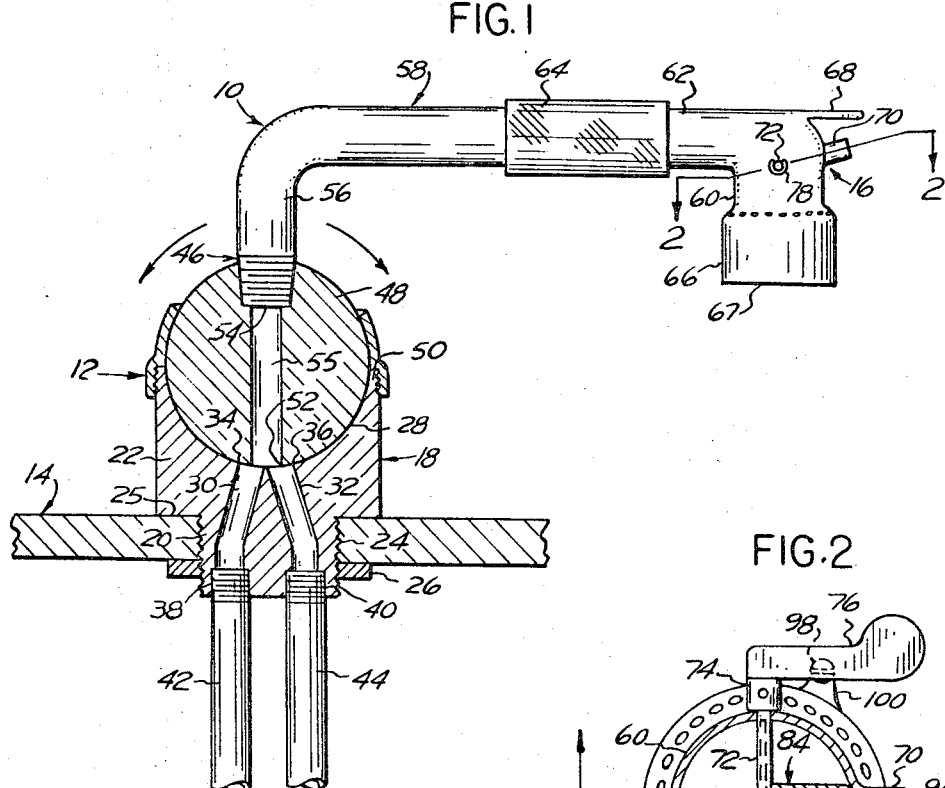
FIG. 2
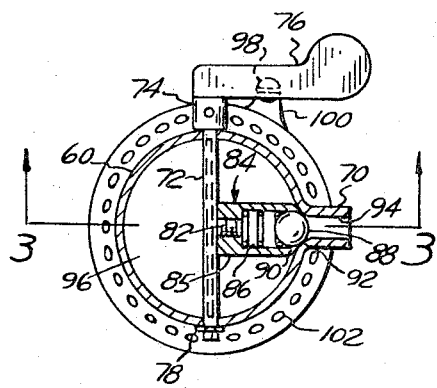
FIG. 3
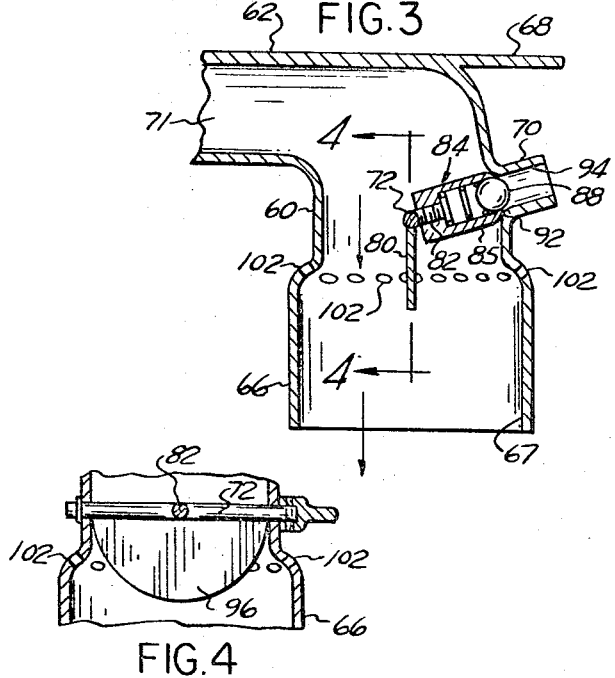
FIG. 5
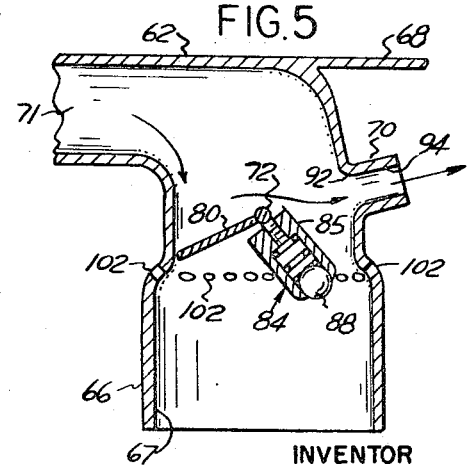
FIG. 4
INVENTOR
HARRY F. GARRISON
BY Barthel & Bugbee
ATTORNEYS

COMBINED FAUCET AND DRINKING FOUNTAIN

In the drawing:

FIG. 1 is a side elevation partly in central vertical section of a combined faucet and drinking fountain;

FIG. 2 is a slightly inclined enlarged cross section taken along the line 2–2 in FIG. 1;

FIG. 3 is a vertical section taken along the line 3–3 in FIG. 2, showing the fountain spout closed;

FIG. 4 is a vertical section taken along the line 4–4 in FIG. 3; and

FIG. 5 is a vertical section similar to FIG. 3 but showing the fountain spout open.

Referring to the drawing in detail, FIG. 1 shows a combined faucet and drinking fountain, generally designated 10, according to one form of the invention as consisting generally of a hot and cold water mixing device 12, a faucet supporting structure 14 and a faucet drinking fountain 16. The hot and cold water mixing device 12 is described and claimed in my U.S. Pat. No. 3,380,478 issued Apr. 30, 1968 for "Hot and Cold Water Mixing Faucet," and its details are consequently beyond the scope of the present invention. Briefly, described, the hot and cold water mixing device 12 includes a stationary faucet base 18 having a reduced diameter threaded stem portion 20 which projects downward from the body 22 of the stationary faucet base 18 through a hole 24 in the faucet supporting structure 14, such as the top of a sink or washbowl (not shown). The faucet base 18 is held in position against the supporting structure 14 by an annular shoulder 25 between the body 22 and stem portion 20 and by a retaining nut 26 threaded upon the threaded stem 20. The body 22 of the faucet base 18 is provided with a substantially hemispherical socket 28 from which two adjacent hot and cold water passageways 30 and 32 respectively extend downward from closely adjacent hot and cold outlet ports 34 and 36 to spaced internally threaded hot and cold water inlet ports 38 and 40 respectively into which are threaded the upper ends of hot and cold water supply pipes 42 and 44 respectively.

The hot and cold water mixing device 12 (FIG. 1) also includes a movable faucet structure 46 having a ball 48, the structure 46 being tiltably mounted in the hemispherical socket 28 in the body 22, which is threaded externally at its upper end to receive an annular internally threaded and curved ball retainer 50. Extending diametrically upward through the ball 48 from a mixing inlet port 52 to a threaded outlet port 54 is a mixed water passageway 55. Threaded into the outlet port 54 is the rearward arm 56 of an approximately inverted U-shaped tubular faucet spout 58 having a forward arm 60 and at an intermediate portion 62 provided with a tubular insulating hand grip 64 for manipulating the faucet spout 58. The forward arm 60 terminates in an enlarged faucet spout outlet nozzle 66 having a mouth 67. The upper part of the forward arm 60 adjacent its junction with the intermediate portion 62 is provided with a forwardly extending splash guard 68. The forward arm 60 on its forward side is also provided with an upwardly inclined tubular drinking spout 80 forming a part of the faucet drinking fountain 16. A faucet spout water passageway 71 extends through the faucet spout 58 from the outlet port 54 to the nozzle 66 and communicates with a drinking spout passageway 73 in the drinking spout 70.

The forward arm 60 of the faucet spout 58 adjacent the nozzle 66 is drilled transversely to receive a shaft 72 (FIG. 2) to one end of which is pinned or otherwise secured the hub 74 of a valve operating handle 76. The opposite end of the shaft 72 is grooved to receive a snap ring 78 which retains it in position in the forward arm 60. Welded or otherwise secured to the rearward side of the shaft 72 is a nearly semicircular baffle plate 82 (FIGS. 3, 4 and 5) movable into and out of obstructing relationship to the passageway 71 and which is disposed obliquely to a threaded stem 82 welded or otherwise secured to the forward side of the shaft 72 (FIGS. 2, 3 and 5). Threaded into the stem 82 is a drinking fountain valve 84 having a tubular valve barrel 85 containing a compression spring 86, the forward end of which engages and urges a valve ball 88 against the annular crimped forward end 90 of the barrel 84. The spring 86 also urges the valve ball 88 against an annular valve seat 92 at the junction of the drinking spout passageway 94 and the faucet passageway 96 in the forward faucet spout arm 60 (FIG. 2). A stop screw 98 threaded into a boss 100 on the forward arm 60 (FIG. 2) limits the arc of swing of the handle 76 and consequently the range of swing of the baffle 80 and valve member 84. Downwardly and inwardly inclined holes 102 drilled in the outlet nozzle 66 draw air into the water stream and thereby prevent or greatly reduce splashing.

In the operation of the combined faucet and drinking fountain 10, water from the hot and cold water supply pipes 42 and 44 passes through their respective passageways 30 and 32 to their respective outlet ports 34 and 36 in the socket 28 of the faucet base 19. Here the hot and cold water mixes at the inlet port 52 in a proportion depending upon the relative areas of the inlet port 52 spanning the ports 34 and 36. This in turn depends upon the amount by which the ball 48 is rotated in its socket 28 by tilting the faucet spout 58 by means of its hand grip 64. The mixed water passes through the passageway 71 in the faucet spout 58 until it reaches the shaft 72 in the forward arm 60. If the handle 76 is in its raised position (FIGS. 2 and 3) with the valve ball 88 engaging the valve seat 92, and the baffle 80 is accordingly directed downward (FIG. 3), the outlet passageway 94 of the drinking spout 70 is closed and all of the water proceeds downward and is discharged through the nozzle 66. The downwardly flowing water draws in air through the inclined holes 102, inhibiting the splashing which would otherwise occur.

If, on the other hand, the user wishes to drink from the faucet 10 and assuming that he desired to drink only cold water, he grasps the hand grip 64 and swings the faucet spout 58 upwardly and rearwardly until the inlet port 52 in the ball 48 is aligned with the outlet port 36 of the cold water passageway 32 while the portion of the ball 48 adjacent its inlet port 52 completely closed the outlet port 34 of the hot passageway 30. He then pushed the handle 76 downward so as to swing the valve ball 88 out of the valve seat 92, at the same time swinging the baffle 80 upward to obstruct the flow of the water through the faucet spout passageway 71. This diverts water from the faucet passageway 71 through the drinking spout passageway 94 into the mouth of the user placed adjacent thereto. The amount by which the valve 84 and baffle 80 will be swung angularly away from the drinking spout valve seat 94 is regulated by rotating the stop screw 98 upward or downward in its boss 100 (FIG. 2) so as to halt the handle 76 at the desired location.

I claim:

1. A combined faucet and drinking fountain, comprising:
   a faucet base;
   a faucet spout projecting forwardly from said base and having a downwardly projecting nozzle portion disposed at the forward end thereof;
   said faucet base having a base passageway therethrough and said faucet spout having a faucet spout passageway therethrough communicating with said base passageway and said nozzle portion;
   a drinking spout disposed on said faucet spout above said nozzle portion and having a drinking spout passageway communicating with said faucet spout passageway;
   valve means disposed in said faucet spout passageway adjacent said drinking spout passageway;
   manually-controlled valve-operating means connected to said valve means and selectively operable to move said means into and out of closing relationship with said drinking spout passageway;
   and a baffle element connected to said valve means and responsive to the operation of said valve-operating means for moving into and out of flow-impeding relationship with said faucet spout passageway;
   said valve-operating means including a rotary shaft disposed within said faucet spout and operatively connected to said valve means, and also including an operating handle secured to said shaft externally of said faucet spout; and said baffle element being mounted on one side of said shaft and said valve means including a valve member mounted on the opposite side of said shaft from said baffle element and extending only partway across said faucet spout passageway and thereby providing constant bypass flow of water through the portions of said faucet spout passageway adjacent said valve member while the faucet is in operation.